United States Patent
Shaffer et al.

(10) Patent No.: US 8,948,369 B2
(45) Date of Patent: Feb. 3, 2015

(54) METHOD AND SYSTEM FOR OPTIMIZING PERFORMANCE WITHIN A CONTACT CENTER

(71) Applicant: Avaya Inc., Basking Ridge, NJ (US)

(72) Inventors: Shmuel Shaffer, Palo Alto, CA (US); Tony McCormack, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/925,024

(22) Filed: Jun. 24, 2013

(65) Prior Publication Data

US 2014/0376710 A1    Dec. 25, 2014

(51) Int. Cl.
*H04M 3/00*    (2006.01)
*H04M 5/00*    (2006.01)

(52) U.S. Cl.
USPC ............... 379/265.06; 379/265.01; 379/309

(58) Field of Classification Search
USPC ............... 379/265.06, 265.01, 309
See application file for complete search history.

(56) References Cited

U.S. PATENT DOCUMENTS

| | | | |
|---|---|---|---|
| 6,741,698 B1 * | 5/2004 | Jensen | 379/265.02 |
| 6,956,941 B1 * | 10/2005 | Duncan et al. | 379/265.01 |
| 2014/0120961 A1 * | 5/2014 | Buck | 455/466 |

* cited by examiner

*Primary Examiner* — Quynh Nguyen
(74) *Attorney, Agent, or Firm* — Maldjian Law Group LLC; John Maldjian; Alexander D. Walter (57) ABSTRACT

A method and system for improving performance within a contact center are provided. The method includes monitoring one or more Key Performance Indicators (KPIs) corresponding to the contact center having one or more agents associated thereto. The method further includes determining a weighted sum of the KPIs based on a weight assigned to each key performance indicator. Further, the method includes modifying one or more parameters within the contact center to improve the weighted sum of the KPIs when the weighted sum of the KPIs crosses beyond a threshold level.

22 Claims, 4 Drawing Sheets

METHOD AND SYSTEM FOR OPTIMIZING PERFORMANCE WITHIN A CONTACT CENTER

BACKGROUND

1. Field of the Invention

Embodiments of the present invention generally relate to contact centers and particularly to automatic optimization of performance within a contact center.

2. Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts (i.e., customers). Contact centers distribute contacts, whether inbound or outbound, for providing service to any suitable resource according to predefined criteria. In many existing systems, the criteria for serving the contact from the moment that the contact center becomes aware of the contact until the contact is connected to an agent are client or operator-specifiable (i.e., programmable by the operator of the contact center), via a capability called vectoring. Normally in present-day Automatic Call distributors (or ACDs) when the ACD system's controller detects that an agent has become available to handle a contact, the controller identifies all predefined contact-handling queues for the agent, usually in some order of priority and delivers to the agent the highest-priority, oldest contact that matches the agent's highest-priority queue.

The primary objective of contact center management is to ultimately maximize contact center performance and profitability. That may involve minimizing cost, maximizing contact throughput, and/or maximizing revenue. Further, ongoing challenges in contact center administration involve optimizing contact center efficiency and keeping the contacts satisfied from the service offered by the contact center.

Contact center efficiency is generally measured in two ways, i.e., service level and match rate. Service level is typically determined by dividing the number of contacts accepted within the specified period by the number accepted plus the number that were not accepted, but completed in some other way (e.g., abandoned, given busy, canceled, flowed out). Of course, service level definitions may vary from one enterprise to another.

Further, match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness and the like, to calculate performance relative to their Service Level Agreements ("SLAs").

Throughput of a contact center is a measure of the number of calls/contact requests or work requests that can be processed by an agent in a given amount of time. Further, to enhance the throughput, agents' utilization and customer satisfaction are the main factors of the contact center. Agent utilization is a measure of how efficiently agents' time is being used. Customer service level is a measure of the time customers spend waiting for their work to be handled. Company contact center wishes to provide service to as many requests as possible in a given amount of time by minimizing the wait time for their customers.

Typically, supervisors in a contact center manage KPIs such as wait time for each queue that may have one or more agents. If a KPI is about to exceed an agreed SLA, supervisors modify parameters such as skills of agents or group of agents in order to increase the number of agents associated with a specific queue requiring one or more specific skills. Further, supervisors can change the number of agents associated with a specific region. Alternatively, supervisors may change the percentage of calls assigned to be handled by a specific queue or a pool of agents. For example, if customer wait times increase or KPIs show low performance of an agent or a group of agents then a supervisor may direct 15% of calls rather than 20% of calls to that agent or the group of agents or a specific outsourcer.

As a result of such parameter modification, KPI of a specific queue may improve. However, KPI of other queues may degrade since fewer agents are assigned to handle callers in that queue. For example, in case, a specific queue has a low KPI due to less skilled agent(s) associated with that queue, then a supervisor may add another agent to that queue from some other queue, and accordingly, the KPI of the other queue may degrade due to reduction in the number of skilled agents from the other queue. In such case, further trial and error method may be used by the supervisors to maintain performance of each queue and so on. Thus, the overall performance of the contact center may not be retained through such manual, trial and error based method. Also, existing solutions may consume significant amount of time on supervisor's behalf to decide for agents' shifting from one queue or department to another queue or department in the effort of maintaining the performance of the contact center.

Based on the aforementioned shortcomings of the background art, systems and a method are needed to overcome existing challenges and to improve the performance of the contact center and in turn further improve agent utilization and customer satisfaction. Thus, the contact center should be able to implement time-effective and automated methods for enhancing overall performance of the contact center.

SUMMARY

Embodiments in accordance with the present invention provide a method for improving a measure of performance within a contact center. A goal of the improvement is to optimize the measure of performance with respect to one or more criteria. The method may include monitoring one or more Key Performance Indicators (KPIs) corresponding to the contact centers having one or more agents associated thereto. The method may further include determining a weighted sum of the KPIs based on a weight assigned to the one or more KPIs. Furthermore, the method may include modifying automatically each of one or more parameters within the contact center to improve the weighted sum of the KPIs. Herein, each of the one or more parameters is modified when the weighted sum of the KPIs crosses beyond a threshold level.

Embodiments in accordance with the present invention further provide a system for improving a performance within a contact center. The system may include a processor, and a memory coupled to the processor. The memory may include a database including at least one of one or more input variables, a threshold value of one or more KPIs, and information corresponding to one or more parameters in the contact center. Further, the memory may include one or more instructions executable by the processor for determining a weighted sum of KPIs by assigning weight to the one or more KPIs. Furthermore, the memory may include one or more instructions for modifying automatically each of the parameters within the contact center for improvement of the weighted sum of the KPIs when the weighted sum of the KPIs crosses beyond the threshold value.

Furthermore, embodiments of the present invention provide a system for improvement of a measure of performance within a contact center. The system may include a multi-variable module for monitoring one or more KPIs corresponding to the contact center having one or more agents. In an embodiment, the KPIs may correspond to a respective queue having one or more agents associated thereto. Further, the system may include a weight calculating module for determining a weighted sum of the KPIs based on a weight assigned to each of the monitored KPIs. Furthermore, the system may include an optimization module for modifying automatically one or more of the parameters within the contact center for improvement of the weighted sum of the KPIs when the weighted sum of the KPIs crosses beyond a threshold value.

In an embodiment, the optimization module may be further configured to determine a gradient for estimating an improvement in each KPI. Accordingly, weighted sum of the KPIs may be maximized with respect to the input variables by using such gradient.

Embodiments of the present invention provides a number of advantages that may include an automated, model based approach to optimally adjusting multivariable inputs for enhancing performance within a contact center. Specifically, embodiments of the present invention may handle the improvement of multiple KPIs within a contact center by improving performance towards multiple goals and taking into account multiple inputs. Further, embodiments of the present invention may provide a mechanism to establish ranges for each input and output, in order to specify acceptable input conditions. Furthermore, embodiments of the present invention may provide a way to alert contact center's supervisor(s) based on the estimated required improvement in any of KPIs. Moreover, embodiments of the present invention may provide an alert to supervisor regarding ways to improve specified goals. Additionally, embodiments of the present invention may establish a mathematical model of the contact center through observation of the input and output variables. In addition, a system in accordance with the present invention may calculate in real time the multi-dimensional surface and changes one or more parameters of the contact center to improve the parameters within pre-determined boundaries to improve a weighted KPI instead of shifting agents from one queue to another queue.

Based on the aforementioned and other additional advantages, it can be concluded that embodiments of the present invention provides automated and model based approach to handle a task of improvement of multiple KPIs within a contact center. Due to this, embodiments of the present invention do not require trial and error manual system and thus, accordingly, embodiments of the present invention require negligible or less effort and time on the supervisors' behalf in maintaining performance within the contact center. Accordingly, embodiments of the present invention can provide an improvement in contact center throughput, agent utilization and customer service level.

These and other advantages will be apparent from the disclosure of the present invention(s) contained herein.

The preceding is a simplified summary of the present invention to provide an understanding of some aspects of the present invention. This summary is neither an extensive nor an exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The present invention will be illustrated below in conjunction with an exemplary communication system. Although well suited for use with, e.g., a system having an ACD or other similar contact processing switch, the present invention is not limited to any particular type of communication system switch or configuration of system elements. Those skilled in the art will recognize that the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

Figure 1:
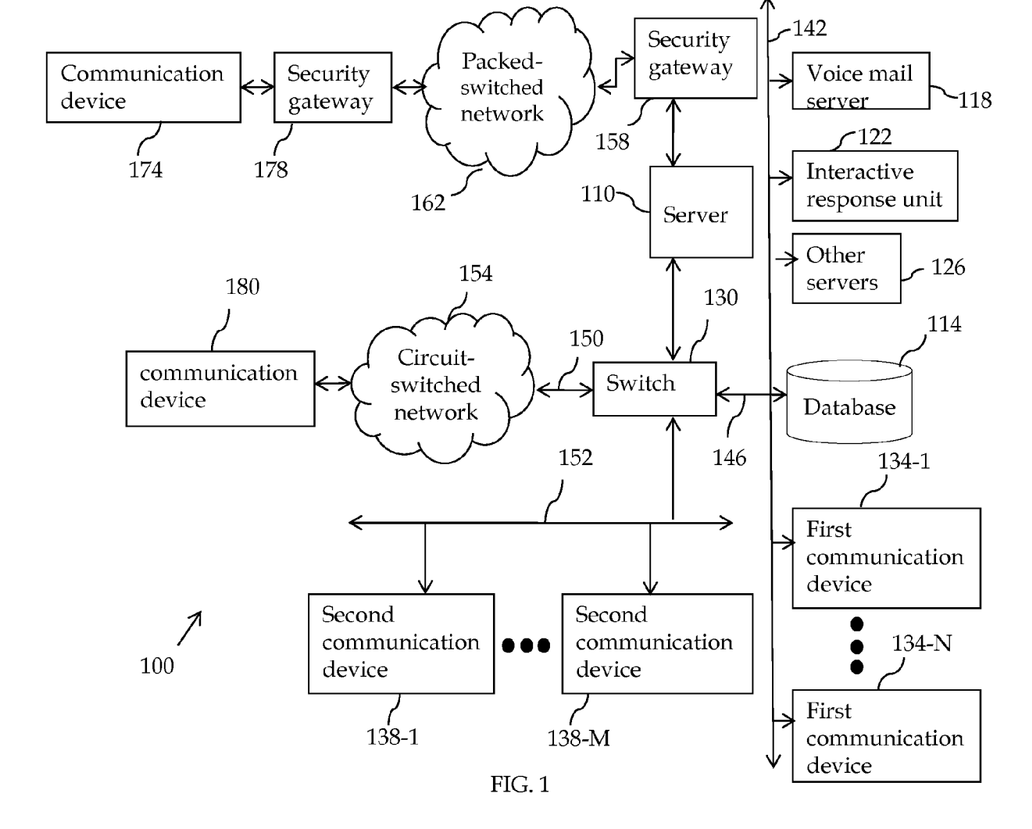
FIG. 1 is a block diagram depicting a contact center according to an embodiment of the present invention.

FIG. 1 shows an illustrative embodiment of a contact center, in accordance with one embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Response unit (e.g., IVR) 122, and other servers 126, a switch 130, a plurality of working agents operating packet-switched communication devices 134-1 to N such as computer work stations or personal computers, and/or circuit-switched communication devices 138-1 to M, all interconnected by a communication network such as local area network ("LAN") 142 and/or wide area network ("WAN"). The servers can be connected via optional communication lines 146 to the switch 130. As will be appreciated, the other servers 126 can also include a scanner that is normally not connected to the switch 130 or Web server, VoIP software, video call software, voice messaging software, an IP voice server, a fax server, a web server, an email server, and the like. The switch 130 is connected via a plurality of trunks 150 to the Public Switch Telephone Network or PSTN 154 and via link(s) 152 to the second communication devices 138-1 to M. A gateway 158 is positioned between the server 110 and the packet-switched network 162 to process communications passing between the server 110 and the network 162.

Further, the gateway 158 can be, but is not limited to, Avaya Inc.'s, G700 Media Gateway™ and may be implemented as hardware such as via an adjunct processor or as a chip in the server.

The server 110 may be in communication with a plurality of customer communication lines, which can be one or more trunks, phone lines, etc., and agent communication line, which can be a voice-and-data transmission line such as LAN 142 and/or a circuit switched voice line. The server 110 may include an operational contact center reporting module (not shown), such as, but not limited to, Avaya IQ™, CMS™, Basic Call Management System™, Operational Analyst™, and Customer Call Routing or CCR™ by Avaya, Inc., that may gather call records and contact-center statistics for use in generating contact-center reports.

The switch 130 and/or server 110 can be any architecture for directing contacts (i.e., customers) to one or more communication devices. In some embodiments, the switch 130 may perform load-balancing functions by allocating incoming or outgoing contacts among a plurality of logically and/or geographically distinct contact centers. Illustratively, the switch and/ or server may be a modified form of the subscriber-premises equipment sold by Avaya Inc. under the names Definity™ Private-Branch Exchange (PBX)-based ACD system, MultiVantage™ PBX, Communication Manager™, S8300™ media server and any other media servers, SIP Enabled Services™, Intelligent Presence Server™, and/ or Avaya Interaction Center™, and any other products or solutions offered by Avaya or another company. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

The first communication devices 134-1, . . . 134-N are packet-switched and may include, for example, hardware-based IP phones such as, but not limited to, the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1, . . . 138-M are circuit-switched. Each of the communication devices 138-1, . . . 138-M may correspond to one of a set of internal extensions Ext1, . . . ExtM, respectively. The second communication devices may include, for example, wired and wireless telephones, PDAs, H.320 videophones and conferencing units, voice messaging and response units, traditional computer telephony adjuncts, and any other communication device.

It should be noted that the present invention does not require any particular type of information transport medium between switch or server and first and second communication devices, i.e., the present invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with a first communication device 174 via a gateway 178, and the circuit-switched network 154 with an external second communication device 180.

In a preferred configuration, the server 110, network 162, and first communication devices 134 are Session Initiation Protocol or SIP compatible and may include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the present invention to any particular arrangement of elements.

Although the preferred embodiment is discussed with reference to a client-server architecture, it is to be understood that the principles of the present invention may apply to other network architectures. For example, the present invention applies to peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the present invention may not require the presence of packet- or circuit-switched networks.

Figure 2:
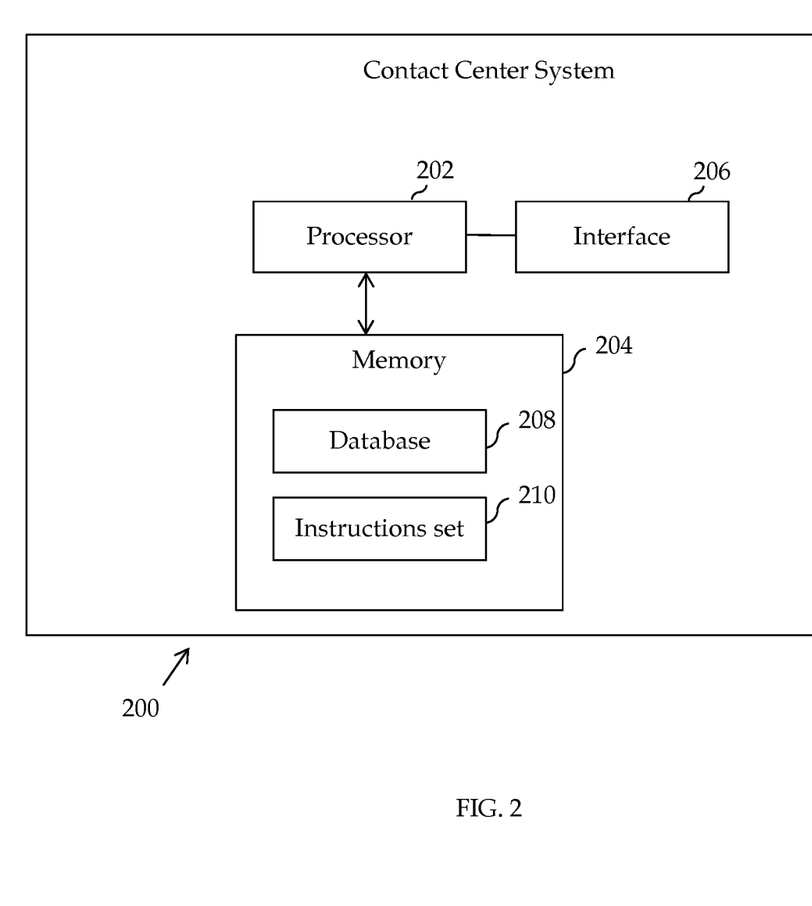
FIG. 2 is a block diagram of a contact center system for improving performance within a contact center, according to an embodiment of the present invention.

FIG. 2 depicts a block diagram of a contact center system 200 for improving performance within a contact center, according to an embodiment of the present invention. The contact center system 200 may be implemented in a contact center or Automatic Call Distribution (ACD). The contact center system 200 (also referred to as "system 200") may have a plurality of agents having different skills and attributes for processing work requests from a plurality of queues in the contact center. Embodiments of the present invention may specify a range of parameters within which the system 200 may operate. In an embodiment, the parameters may include, but are not limited to, a proficiency level of one or more agents in a queue, a number of calls to be transferred to an outsourcer based on a service level agreement (SLA). As depicted, the contact center system 200 may include, but is not limited to, a processor 202, a memory 204 and an interface 206.

Further, the memory 204 may include a database 208 and instructions set 210. The database 208 may include, but is not limited to, at least one of one or more input variables, a threshold value of each Key Performance Indicator ("KPI") and information corresponding to one or more parameters in the contact center. The input variables may include, but are not limited to, predetermined attributes of agents, number of calls requiring predetermined skill set, and number of agents with the predetermined attributes. In an embodiment, the threshold value may include, but is not limited to, a maximum time that an outsourcer is permitted to let a customer wait for required service, per an SLA.

Further, the processor 202 may be coupled to the memory 204 to execute instructions stored in the instructions set 210 of the memory 204. The processor 202 may execute one or more instructions of the instructions set 210 to determine or monitor output variables such as KPIs of the contact center. The KPIs may be monitored to determine performance of the contact center. For example, the KPIs may include, but are not limited to, average wait time, total revenue, number of calls resolving issues in first call and so on. Further, the KPIs may correspond to performance of one or more agents that may be associated with one or more queues in the contact center.

Further, the instructions stored in the instructions set 210 may be executed by the processor 202 to assign weight to each output KPI and may determine a weighted sum of the KPIs based on a weight assigned to each KPI. It may be appreciated by a person skilled in the art that the weight of each KPI may be linear or a step function, or a combination of both depending upon the KPI value. For example, a KPI such as waiting time may be weighted as a step function in order to ensure that the wait time does not increase above a predetermined threshold level.

In accordance with one embodiment of the present invention, the contact center system 200 may calculate in real time the multidimensional surface and may change one or more parameters of the contact center to improve the parameters within pre-determined boundaries and further accordingly may improve the determined weighted KPI corresponding to the contact center. More specifically, a gradient method may be utilized to estimate an improvement to one or more KPI that is achievable by varying an operational parameter of the contact center. For example, a number of assigned agents having a particular skills-set may be varied for a particular queue, in the contact center, based on the estimated improvement. The KPIs may be improved based on such variation in the number of assigned agents.

Accordingly, each of one or more parameters within the contact center may be modified automatically for improvement of the weighted sum of the KPIs. Herein, each of parameters may be modified when the weighted sum of the KPIs crosses beyond a threshold value that may be stored in the database 208. For example, if the wait time for a customer is increasing beyond the threshold value (e.g., twenty seconds) then a set of input changes may be determined to estimate a number of agents required with increased level of proficiency for improving a KPI such as wait time for each customer.

In an embodiment, the one or more parameters may be modified based one or more input variables corresponding to the agents employed by the contact center and that may be stored in the database 208. In one embodiment, the agents may be outsourcers employed by the contact center. In another embodiment, the agents may be employed by an outsourcer having an SLA with the contact center. The system 200 may retrieve the input variables from the database that may be analyzed by the processor 202 for determining required modification in the parameters based thereon. Accordingly, the parameters may be modified in the contact center for improving the performance of the contact center.

Further, the processor 202 may be communicably coupled to the interface 206 for providing information corresponding to the required modification in the parameters, corresponding to the system 200, for enhancing the performance of the contact center. In an embodiment, the information may be provided based on one or more methods, such as a gradient method that may be utilized to estimate the improvement in the KPIs. Specifically, the processor 202 may determine change in one or more input variables in order to maximize the weighted sum of the KPIs. In an embodiment, the interface 206 may enable the system 200 to provide the information on a display (not shown in the figure).

Further, the information corresponding to the estimated improvement (or required modification in the parameters) may be provided to one or more supervisors of agents to provide suggestions based on the estimated improvement in the KPI. Further, the system 200 may request a supervisor through the interface 206 to provide approval for automatic modification of each of the parameters for improving the weighted sum of the KPI. Further, in an embodiment, the approval is requested from the supervisor based on the estimated improvement in the KPI. For example, if the processor 202 detects that the opportunity or the estimated improvement in the KPI is approximately 3%, the system 200 may then request the supervisor through the interface 206 to approve modifications in attributes or parameters of the contact centers.

Further, the interface 206 may receive an input from the supervisor for modifying the parameters to improve the performance in the contact center. In such cases, the system 200 may not require shifting agents from one queue to another to perform trial and error manual method and thus may enable the system 200 to improve the performance through a range of parameters.

Furthermore, in an embodiment, the system 200 may provide a mechanism to identify a multi-variable system through observation of input variables and output variables such as KPIs based on normal conditions. For example, the system 200 may develop a mathematical model using various modeling techniques. Further, such multi-variable system may be utilized for simulation purposes.

Figure 3:
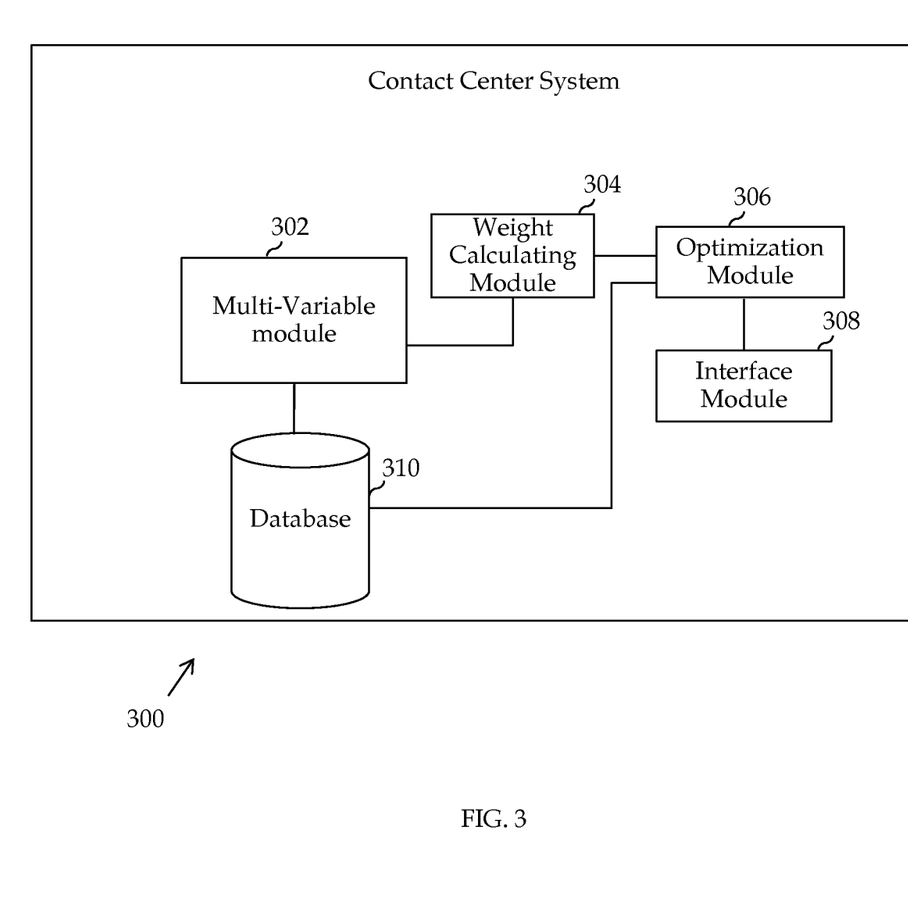
FIG. 3 depicts an exemplary block diagram to illustrate various modules of the contact center system for improving performance within a contact center, according to an embodiment of the present invention.

FIG. 3 depicts an exemplary block diagram to illustrate various modules of the contact center system for improving performance within a contact center, according to an embodiment of the present invention. As depicted, FIG. 3 represents a contact center system 300 (also referred to herein as "system 300") having various modules that may have one or more instructions to improve performance within a contact center. FIG. 3 may be understood more clearly when read in conjunction with description of FIG. 2.

As shown, the contact center system 300 may include, but is not limited to, a multi-variable module 302, a weight calculating module 304, an improvement module 306, an interface module 308 and a database 310. Further, the multi-variable module may be communicably coupled to the database 310 and the weight calculating module 304. The multi-variable module 302 may be configured to monitor one or more KPIs corresponding to each queue having one or more agents associated thereto. The KPIs may include, but is not limited to, at least one of an average wait time, total revenue, and a number of calls resolving issue in a first call. For determining KPIs, the multi-variable module 302 may utilize various input factors such as, but not limited to, input variables like predetermined attributes of agents, a number of calls requiring predetermined skill set, a number of agents with the predetermined attributes and the like. Such input factors may be stored in the database 310 along with other information corresponding to at least one of threshold value of each KPI and various attributes and parameters within the contact center.

The monitored KPIs may enable the system 300 to determine performance of each queue or department having one or more agents to serve the customers. Further, the monitored KPIs may be provided to the weight calculating module 304 that may assign a weight to each of the monitored KPIs. In an embodiment, the weight assigned to each KPI may be one of linear and a step function, or a combination of both depending upon the KPI value. Further, the weight calculating module 304 may determine a weighted sum of the KPIs based on individual weights assigned to each of the monitored KPIs.

Further, the determined weighted sum of the KPIs may be provided to the optimization module 306 for improving one or more parameters or attributes of the contact center within pre-determined boundaries so as to improve the weighted sum of the KPIs. Specifically, the optimization module 306 may modify automatically each of the parameters within the contact center for improvement of the weighted sum of the KPIs when the weighted sum of the KPIs crosses beyond a threshold value.

In an embodiment, the optimization module 306 may further be configured to determine a gradient for estimating an improvement (or the required improvement) in each KPI. Accordingly, the optimization module 306 may improve the weighted sum of the KPIs for improving the overall performance in the contact center.

Further, the optimization module 306 may provide one or more alerts for suggesting a supervisor of one or more agents in the contact center regarding the estimated required improvement in the KPI. Such suggestion may be provided based on the determined gradient through the interface module 308. Further, the interface module 308 may request the supervisor for providing approval for automatic modification of each of the parameters for improving the weighted sum of the KPI. Further, the approval may be requested based on the estimated required improvement in the KPI as the information corresponding to the estimated required improvement may also be provided to the supervisor in advance prior to modifying the parameters in the contact center.

Figure 4:
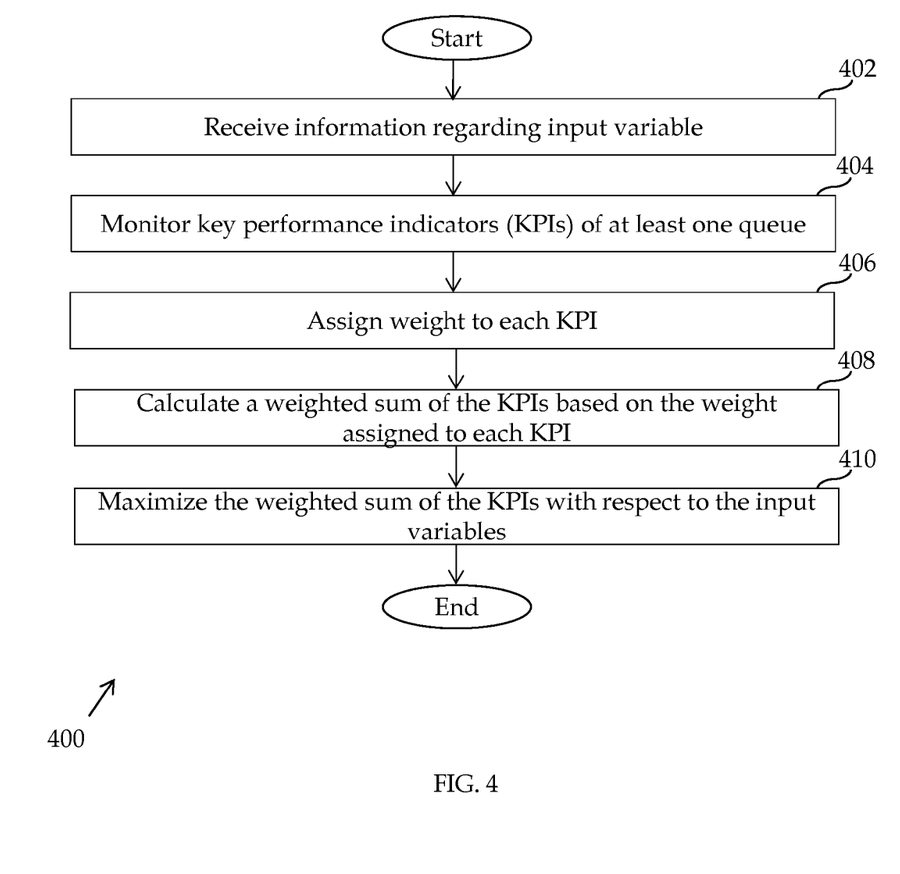
FIG. 4 illustrates a flow diagram of a method for serving customers in a contact center according to one embodiment of the present invention.

FIG. 4 illustrates a flow diagram of a method 400 for serving customers in a contact center according to one embodiment of the present invention. The embodiments of the method as depicted in FIG. 4 may be understood more clearly when read in conjunction with description of previous figures, such as FIGS. 1, 2 and 3. The order in which the method is performed is not intended to be construed as limitation, and further any number of the method steps may be combined in order to implement the method or an alternative method without departing from the scope of the present invention.

At step 402, the method may receive information regarding input variables. The input variables may include, but are not limited to, predetermined attributes of agents, number of calls requiring predetermined skill set, and a number of agents with the predetermined attributes. In an embodiment, the input variables may be retrieved from a database, such as the database 310. In another embodiment, the input variables may be received as input from a user. In an embodiment, the input variable may be assigned with an acceptable range of values within the contact center. For example, each input variable may have a minimum value and a maximum value that define an acceptable range thereof.

At step 404, various output variables, such as KPIs may be monitored for at least one queue of the contact center. Each queue may have number of customers and one or more agents for handling the number of customers. Each agent may have attributes and skill set that may make an agent eligible for a predetermined queue to handle customers corresponding to that queue. For each queue in the contact center, one or more KPIs may be monitored to determine performance measures of one or more agents based on their SLAs.

At step 406, weight is assigned to each monitored KPI. For example, a weight may be assigned to waiting time of each customer. The assigned weight may be linear value or a step function, or a combination of both depending upon the KPI value. For example, weight of waiting time may be a step function in order to ensure that the wait time does not increase above a predetermined threshold. Further, at step 408, a weighted sum of the KPIs may be calculated based on the weight assigned to each KPI. Furthermore, at step 410, the weighted sum of the KPIs may be maximized with respect to the input variables by utilizing one or more methods. For example, the weighted sum of the KPIs may be maximized by using a gradient method. Herein, the gradient method may be used to maximize the function of input variables corresponding to the contact center. Further, the function may be equated to the weighted sum of the KPIs in the contact center. Accordingly, the gradient method may be utilized to estimate an improvement in the KPIs. For example, if the weighted sum of the KPIs such as an average weight time increases beyond a threshold value then the required improvement may be determined in each KPI using a known gradient method. Further, it may be appreciated by a person skilled in the art that the present invention is not restricted to the usage of the gradient method. Further, one or more other methods may be utilized by the present invention to maximize the weighted sum of the KPIs with respect to the input variables.

Specifically, one or more parameters or attributes of the contact center may be modified automatically to improve the weighted KPI(s). Further, in an embodiment, the parameters may be modified based on the one or more input variables, corresponding to one or more agents, such as predetermined attributes of agents, number of calls requiring predetermined skill set, number of agents with the predetermined attributes and the like. For example, the parameters of the contact center may be modified if a predetermined attribute (e.g., proficiency) of an agent reduces below a threshold level.

Further, in an embodiment, the method 400 may provide suggestions to a supervisor based on the estimated improvement in the KPI. The suggestion may be provided in the form of an alert. Further, the method may request a supervisor for providing an approval for an automatic modification of at least one of the parameters for improving the weighted sum of the KPI. Herein, the approval may be requested based on the estimated improvement in the KPI.

The order in which the method is performed is not intended to be construed as limitation, and further any number of the method steps may be combined in order to implement the method or an alternative method without departing from the scope of the present invention. It may be appreciated by a person skilled in the art that the embodiment of the method of the present invention may not be limited to the description of method FIG. 4. Further, various embodiments and steps may be implemented within the scope of the present invention. For example, information corresponding to various attributes and activities of the agents and customers may be stored in a database, such as the database 310.

The exemplary systems and methods of this present invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/ or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method to improve a performance within a contact center, the method comprising:
    monitoring, by a processor, a plurality of key performance indicators corresponding to the contact center;
    determining a weighted sum of the plurality of key performance indicators based on a weight assigned to the plurality of key performance indicators; and
    modifying automatically one or more parameters within the contact center, within a predetermined range of the respective one or more parameters, to improve the weighted sum of the plurality of key performance indicators, wherein the one or more parameters is modified when the weighted sum of the key performance indicators crosses beyond a threshold level.

2. The method of claim 1 further comprising receiving information corresponding to one or more input variables associated with the contact center.

3. The method of claim 1, wherein the key performance indicators correspond to a queue having one or more agents associated therewith.

4. The method of claim 1 further comprising use of the gradient method to maximize the weighted sum of the key performance indicators.

5. The method of claim 1 further comprising providing suggestions based on an estimated improvement in the key performance indicators.

6. The method of claim 1 further comprising requesting a supervisor to provide approval of automatic modification of the one or more parameters to improve the weighted sum of the plurality of key performance indicators, wherein the approval is requested based on an estimated improvement in at least one of the plurality of key performance indicators.

7. The method of claim 1, wherein the weight assigned to the plurality of key performance indicators is one of a linear function, a step function and a combined linear and step function.

8. The method of claim 1, wherein at least one of the one or more parameters is automatically modified based on one or more input variables corresponding to one or more agents employed by the contact center.

9. The method of claim 1, wherein the key performance indicators comprise at least one of an average wait time, a total revenue, and number of calls resolving issue in a first call.

10. A system to improve a performance within a contact center, the system comprising:
    a processor;
    a memory coupled to the processor, the memory configured to store:
        a database comprising at least one of 11 input variables, a threshold value of a respective one of a plurality of key performance indicators, and information corresponding to one or more parameters in the contact center;
        one or more instructions executable by the processor to determine a weighted sum of key performance indicators by assigning weight to a respective each of a plurality of key performance indicators; and
        one or more instructions to modify automatically at least one of the parameters within the contact center, within a predetermined range of the respective one or more parameters, to improve of the weighted sum of the key performance indicators when the weighted sum of the key performance indicators crosses beyond the threshold value.

11. The system of claim 10, wherein the memory is further configured to store one or more instructions to monitor the plurality of key performance indicators.

12. The system of claim 10, wherein the memory is further configured to store one or more instructions to determine a gradient used to estimate an improvement to at least one key performance indicator.

13. The system of claim 12, wherein at least one of the parameters is automatically modified within the contact center, to improve the weighted sum of the key performance indicators, based upon the determined gradient.

14. The system of claim 10, wherein the memory is further configured to store one or more instructions to receive information corresponding to 1 input variables associated with the contact center.

15. The system of claim 12, wherein the memory is further configured to store one or more instructions to provide suggestions based on the estimated improvement in the key performance indicator.

16. The system of claim 10, wherein the weight assigned to the plurality of key performance indicators is one of a linear function, a step function and a combined linear and step function.

17. The system of claim 10, wherein the memory is further configured to store one or more instructions to automatically modify the parameters based on one or more input variables corresponding to one or more agents employed by the contact center.

18. A system to improve a performance within a contact center, the system comprising:
    a multi-variable module configured to monitor a plurality of key performance indicators corresponding to a respective queue, the respective queue having one or more agents associated thereto;
    a weight calculating module configured to determine a weighted sum of the key performance indicators based on a weight assigned to one or more of the monitored plurality of key performance indicators; and
    an optimization module configured to modify automatically one or more of the parameters within the contact center, within a predetermined range of the respective one or more parameters, to improve the weighted sum of the key performance indicators when the weighted sum of the key performance indicators crosses beyond a threshold value.

19. The system of claim 18, wherein the optimization module is further configured to determine a gradient to estimate an improvement in at least one of the plurality of key performance indicator.

20. The system of claim 19 further comprising an interface module configured to:
    provide suggestions based on the estimated improvement in the key performance indicator; and
    request a supervisor to provide approval to automatic modify one or more of the parameters to improve the weighted sum of the key performance indicator, the approval requested based on the estimated improvement in the key performance indicator.

21. The system of claim 18, wherein the multi-variable module is further configured to receive information corresponding to one or more input variables associated with the contact center, wherein one or more of the parameters are modified based on the one or more input variables.

22. The system of claim 18 further comprising a non-volatile data storage configured to store information corresponding to at least one of one or more input variables, the threshold values of more at least one of the plurality of key performance indicators and the parameters within the contact center.

* * * * *